(12) United States Patent
Lee et al.

(10) Patent No.: US 11,768,015 B2
(45) Date of Patent: Sep. 26, 2023

(54) COOLING MACHINE

(71) Applicant: LG ELECTRONICS INC., Seoul (KR)

(72) Inventors: Heungju Lee, Seoul (KR); Yongsun Cho, Seoul (KR); Jaeseo Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 359 days.

(21) Appl. No.: 17/148,960

(22) Filed: Jan. 14, 2021

(65) Prior Publication Data
US 2021/0215404 A1    Jul. 15, 2021

(30) Foreign Application Priority Data

Jan. 15, 2020  (KR) .................. 10-2020-0005508

(51) Int. Cl.
*F25B 15/00* (2006.01)
*F25B 41/40* (2021.01)

(52) U.S. Cl.
CPC .......... *F25B 15/008* (2013.01); *F25B 41/40* (2021.01); *F25B 2315/005* (2013.01); *F25B 2600/05* (2013.01)

(58) Field of Classification Search
CPC ....... F25B 15/006; F25B 15/008; F25B 15/02
See application file for complete search history.

(56) References Cited

U.S. PATENT DOCUMENTS

| | | | | |
|---|---|---|---|---|
| 4,542,629 A | * | 9/1985 | Biermann | ............. F25B 15/006 62/476 |
| 5,390,509 A | * | 2/1995 | Rockenfeller | ........ F25B 15/008 62/476 |
| 5,746,059 A | * | 5/1998 | Sarkisian | ............... C09K 5/047 62/476 |

(Continued)

FOREIGN PATENT DOCUMENTS

| CN | 102032706 A | 4/2011 |
|---|---|---|
| CN | 102200357 A | 9/2011 |

(Continued)

OTHER PUBLICATIONS

Notice of Allowance, dated Jun. 22, 2021, issued in Korean Patent Application No. 10-2020-0005508 (2 pages).

*Primary Examiner* — Christopher R Zerphey
(74) *Attorney, Agent, or Firm* — Birch, Stewart, Kolasch & Birch, LLP

(57) ABSTRACT

The present disclosure relates to an absorption cooling machine including an absorber, a first regenerator, a second regenerator, a condenser, an expansion device, and an evaporator, and relates to a cooling machine that connects a bypass collection pipe that guides an absorbent flowing back into the second regenerator to be collected into an absorber to a second collection pipe, in order to prevent the water level of the second regenerator from being raised as the absorbent cannot be collected by the absorber and flows back to the second regenerator, due to the pressure difference between an absorbent separated from the first regenerator and collected into the absorber through the first collection pipe, and an absorbent separated from the second regenerator and collected into the absorber through the second collection pipe.

12 Claims, 4 Drawing Sheets

(56) References Cited

U.S. PATENT DOCUMENTS

| | | | | |
|---|---|---|---|---|
| RE36,045 E | * | 1/1999 | Rockenfeller | F25B 15/008 62/476 |
| 5,931,007 A | * | 8/1999 | Sgamboti | F25B 15/008 62/476 |
| 5,941,094 A | * | 8/1999 | Tang | F25B 15/008 62/497 |
| 6,003,331 A | * | 12/1999 | Kohler | F25B 15/008 62/476 |
| 6,536,229 B1 | * | 3/2003 | Takabatake | F25B 15/008 62/481 |
| 6,598,420 B2 | * | 7/2003 | Gupte | F25B 33/00 62/476 |
| 10,208,989 B2 | * | 2/2019 | Cho | F25B 15/008 |

FOREIGN PATENT DOCUMENTS

| | | |
|---|---|---|
| CN | 106969530 A | 7/2017 |
| JP | H08-313108 A | 11/1996 |
| JP | 2003-214720 A | 7/2003 |
| JP | 2006-162104 A | 6/2006 |
| KR | 10-2020-0120188 | 10/2020 |

\* cited by examiner

COOLING MACHINE

BACKGROUND

1. Technical Field

The present disclosure relates to a cooling machine, and more particularly, to a bypass collection pipe for preventing a phenomenon that an absorbent which is separated from a regenerator of an absorption cooling machine and is to be collected by the absorber flows back to the regenerator.

2. Description of the Related Art

A cooling machine, which is a facility for lowering the temperature of cold water, reduces the temperature of a cold water through a series of cycles in which a high-temperature and high-pressure refrigerant is condensed by heat exchange with the cooling water, and then goes through an expansion process to reduced to a low temperature and low pressure state, and the low temperature and low pressure refrigerant absorbs heat from cold water and evaporates to cool cold water.

At this time, according to the method of making the refrigerant into a high temperature and high pressure state, a cooling machine can be classified as a compression cooling machine that compresses refrigerant Into high temperature and high pressure state by a compressor, and an absorption cooling machine that extracts high-temperature and high-pressure refrigerant by heating it a regenerator in the state of an absorption solution mixed with an absorbent.

Among these, in the case of a large building that requires cooling of large-capacity cold water, it common to use an absorption cooling machine.

The absorption cooling machine includes an absorber that dissolves the refrigerant into the absorbent to make an absorption solution and then supplies it to the regenerator, a regenerator that heats the absorption solution supplied from the absorber to separate into a liquid absorbent and a gas state refrigerant, a condenser that heat exchanges the gas state refrigerant introduced from the regenerator into a liquid state, an expansion device that expands and depressurizes the refrigerant introduced from the condenser, and an evaporator that evaporates the aid refrigerant introduced from the expansion device by heat exchange with cold water, and then introduces again into the absorber.

The absorption cooling machine may be classified into a single-utility absorption cooling machine using a single regenerator, a double-utility absorption cooling machine using two regenerators, and a triple-utility absorption cooling machine using three regenerators.

Among the three types of absorption cooling machine, a double-utility or triple-utility absorption cooling machine that can obtain high efficiency is generally used in a large building.

The regenerator of the double-utility or triple-utility absorption cooling machine is configured to include a first regenerator that separates absorbent and refrigerant under a relatively high pressure and high temperature condition, and a second regenerator that separates absorbent and refrigerant under a relatively low pressure and low temperature condition, and the absorbent separated from the above mentioned two regenerators is collected into the absorber through a collection pipe.

At this time, in the process where the absorbent separated from the first regenerator and the absorbent separated from the second regenerator are converged and collected by the absorber, the converged absorbent cannot be normally collected by the absorber, due to the pressure difference between the converging flows, and there was a problem of backflow in the direction of the second regenerator.

The backflow problem as described above prevents the absorbent from being smoothly collected by the absorber, which not only negatively affects the circulation of the absorbent liquid, but also increases the water level of the second regenerator due to the backflow of absorbent. Therefore, the absorbent mixed with the refrigerant and introduced into a refrigerant pipe contaminates the refrigerant pipe, thereby ultimately lowering the overall efficiency of the cooling machine and causing a problem of shortening the life of the cooling machine.

In Korean Patent Registration No. 10-1702952, the overall efficiency of the absorption cooling machine is increased by changing the arrangement structure between the regenerators, but a method for solving the problem of reduced efficiency or shortened lifespan caused by the backflow of absorbent to a regenerator of a low pressure condition is not proposed.

Korean Patent Registration No. 10-1690303 increases the overall efficiency of the absorption cooling machine by branching the absorbent in the dilute solution state which flows into the regenerator in a high temperature condition through a bypass pipe, but cannot solve the problem of rising of water level in the regenerator in a low temperature condition as the branched absorbent in the dilute solution state flows into the regenerator in a low temperature condition.

SUMMARY

The present disclosure has been made in view of the above problems, and prevents a problem that may occur as an absorbent flows back to a regenerator, by guiding the absorbent that is not normally collected to an absorber and flows back to the regenerator of low pressure condition through a bypass collection pipe.

The present disclosure further provides a feedback device such as a valve or a pump to prevent the absorbent from unnecessarily flowing into the bypass collection pipe when the absorbent circulates normally, so that the bypass collection pipe functions selectively only in the case of abnormal circulation.

The present disclosure connects a drain pipe to the regenerator which has a problem in the water level rise, so that even when the water of the regenerator rises rapidly, it is possible to respond promptly.

In accordance with an aspect of the present disclosure, a cooling machine includes: an absorber in which an absorption solution is generated by mixing a refrigerant and an absorbent, a first regenerator in which the absorption solution discharged from the absorber is heated to be separated into the refrigerant and the absorbent, a second regenerator which the absorption solution discharged from the absorber heated to be separated into the refrigerant and the absorbent, a first collection pipe through which the absorbent discharged from the first regenerator flows, and is connected to the absorber, and a second collection pipe through which the absorbent discharged from the second regenerator flows, and further includes a bypass collection pipe which is branched between the second regenerator and the confluence point and connected to the absorber.

The bypass collecton pipe may be connected to a bypass decompression device that lowers a pressure of the absorbent flowing through the bypass collection pipe.

The bypass collection pipe is connected to a bypass valve that adjusts an opening degree according to a value measured by a water level sensor detecting water level of the second regenerator, and a bypass pump for adjusting an extrusion amount of the absorbent according to a value measured by the water level sensor.

The cooling machine may further include a drain pipe which is connected to the second regenerator and the bypass collection pipe, and through which the absorbent flows, and the drain pipe may be connected to a drain valve whose opening degree is adjusted according to a value measured by a water level sensor detecting the water level of the second regenerator, and a drain pump whose extrusion amount is adjusted according to a value measured by the water level sensor.

The second collection pipe may be connected to a backflow prevention valve that adjusts the flow rate of the absorbent flowing through the second collection pipe, and the opening degree of the backflow prevention valve can be adjusted according to a value measured by a water level sensor detecting the water, level of the second regenerator.

Specific details of other embodiments are included in the detailed description and drawings.

BRIEF DESCRIPTION OF THE DRAWINGS

The above and other objects, features and advantages of the present disclosure will be more apparent from the following detailed description in conjunction with the accompanying drawings, in which:

FIG. 2 is a diagram showing the flow of an absorbent according to an embodiment of the present disclosure.

DETAILED DESCRIPTION

Figure 1:
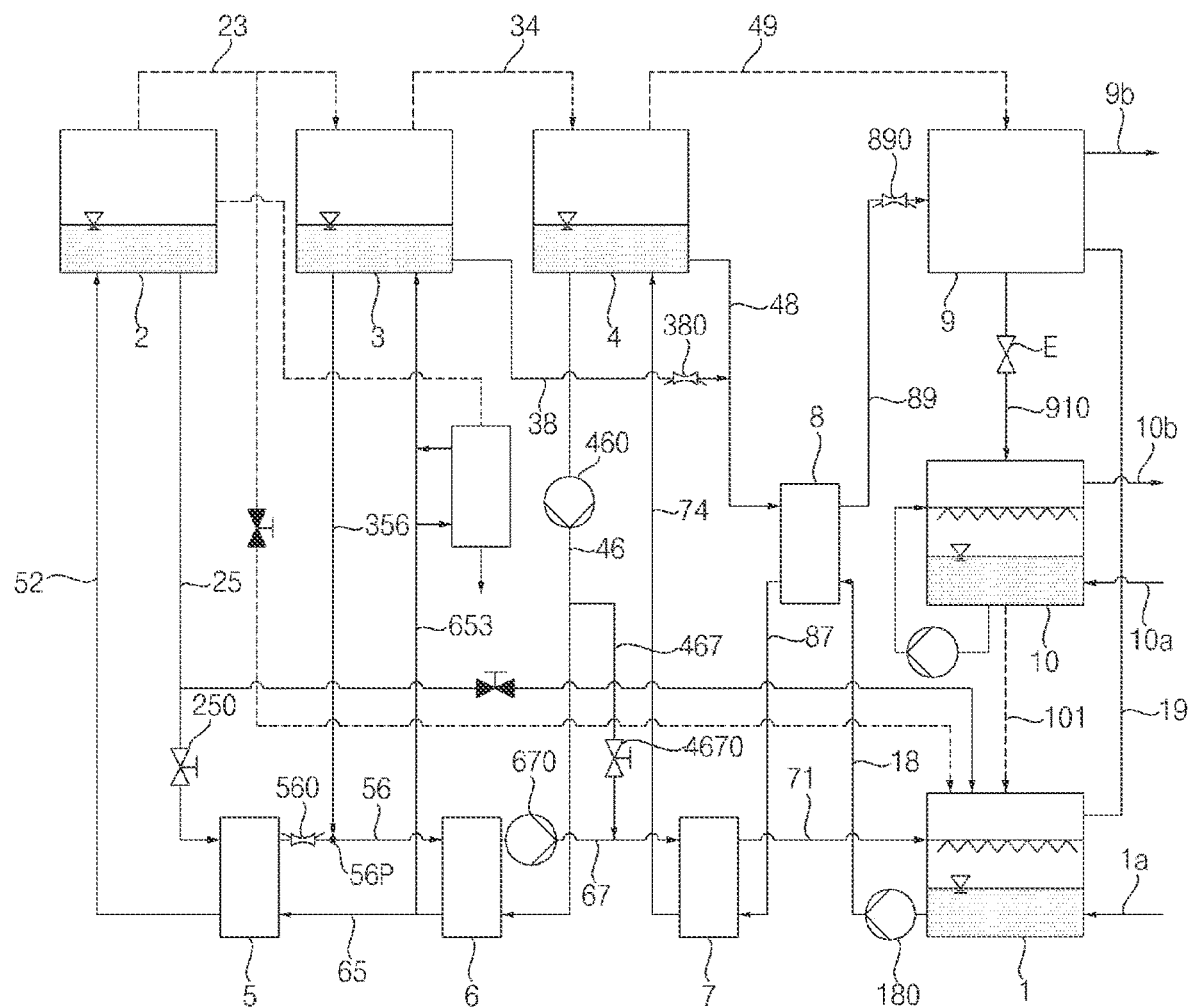
FIG. 1 is a schematic configuration diagram of a triple-utility absorption cooling machine.

Advantages and features of the present disclosure and methods for achieving them will be made clear from the embodiments described below in detail with reference to the accompanying drawings. The present disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art. The present disclosure is defined only by the scope of the claims. Like reference numerals refer to like elements throughout the specification.

Hereinafter, the present disclosure will be described with reference to drawings for explaining a cooling machine according to embodiments of the present disclosure.

The cooling machine, which is facilities for lowering the temperature of cold water, can be classified into a compression cooling machine and an absorption cooling machine according to a method of making the refrigerant into a high temperature and high pressure state.

Among them, unlike a compression cooling machine that uses a compressor to making the refrigerant into a high temperature and high pressure state, the absorption cooling machine uses a method of separating the refrigerant in the high temperature and high pressure state by heating the absorption solution that is a mixture of the absorbent and the refrigerant in a regenerator.

The absorption cooling machine may be classified into a single-utility, a double-utility, and a triple-utility according to the regenerator used, the double-utility absorption cooling machine is a cooling machine that separates the absorption solution by using two types of regenerators, and the triple-utility absorption cooling machine is a cooling machine that separates the absorption solution by using three types of regenerators.

The double-utility triple-utility absorption cooling machine having high-efficiency is generally used as the absorption cooling machine that is used in a large building in order to cool large-capacity cold water.

Water H2O or ammonia NH3 is generally used as the refrigerant used in the absorption cooling machine.

Hereinafter, with reference to FIG. 1, the configuration and operation principle of the triple-utility absorption cooling machine will be described.

The expressions high temperature, medium temperature, low temperature with respect to temperature and high pressure, medium pressure, and low pressure with respect to are a comparative concept for describing a relative temperature between respective regenerator 2, 3, 4 or respective heat exchange units 5, 6, or a directional concept for indicating the heat entry and exit path related to heat emission and absorption occurring in each heat exchange unit 5, 6, 7. Further, they are only for convenience of description, and not limited to any specific temperature range or pressure range.

The triple-utility absorption cooling machine may be configured of a cycle including an absorber 1 that dissolves the refrigerant of a gas state into a liquid absorbent to make an absorption solution and supplies the absorption solution to regenerators 2, 3, 4, a regenerator 2, 3, 4 that heats the absorption solution supplied from the absorber separate into a refrigerant and an absorbent, a heat exchange unit 5, 6, 7 that exchanges the heat of the absorbent separated from the regenerators 2, 3, 4 and collected by the absorber 1 with the absorption solution suppled from the absorber 1 to the regenerators 2, 3, 4, a refrigerant condensation heat exchange unit 8 for heat-exchanging the liquid refrigerant discharged from the regenerators 2, with the absorption solution discharged from the absorber 1, a condenser 9 for condensing the refrigerant separated from the regenerator 2, 3, 4 by heat exchange with the cooling water, an expansion device L for expanding and decompressing the liquid refrigerant discharged from the condenser 9, and an evaporator 10 that evaporates the decompressed refrigerant by heat-exchanging with cold water and then re-flows it into the absorber 1.

The regenerators 3, and 4 may include a first regenerator 2 for heating the absorption solution supplied from the absorber through an external heat source to separate into a high-temperature refrigerant and an absorbent, second regenerator 3 for separating the absorption solution supplied from the absorber 1 into a medium-temperature refrigerant and an absorbent by using the high-temperature refrigerant supplied from the first regenerator 2 as a heat source, and a third regenerator 4 for separating the absorption solution supplied from the absorber 1 into a low-temperature refrigerant and an absorbent by using medium temperature refrigerant supplied from the second regenerator 3 as a heat source.

At this time, the supply of the absorption solution from the absorber 1 is not limited to the operation of being directly connected to the absorber 1 and supplied with the absorption solution, but also includes the operation of being connected indirectly through other components to receive the absorption solution.

In the regenerator 2, 3, 4, the temperature and pressure are decreased is the order of the first regenerator 2, the second regenerator 3, and the third regenerator 4. Therefore, hereinafter, the first regenerator 2 is referred to as a high temperature regenerator the second regenerator 3 as a medium temperature regenerator 3, and the third regenerator 4 as a low temperature regenerator 4.

The absorbent separated from the regenerator 2, 3, may undergo a heat exchange process in the heat exchange unit 5, 6, 7 in the process of being collected to the absorber 1.

Hereinafter, it will be referred to as a high temperature heat exchange unit 5, a medium temperature heat exchange unit 6, and a low temperature heat exchange unit 7 in the order in which the temperature condition of heat exchange is high.

The high temperature heat exchange unit 5 heat-exchanges the high-temperature absorbent separated from the high temperature regenerator 2 and introduced through a high-temperature discharge pipe 25 with the absorption solution of the medium temperature discharged from the medium-temperature heat exchange unit 6 and introduced through a second supply pipe 65, and then, the heat-exchanged absorption solution of the medium temperature is discharged to first connection pipe 56, and the heat-exchanged high-temperature absorption solution is discharged to a high-temperature inflow pipe 52.

The medium temperature absorbent discharged from the high temperature heat exchange unit 5 is introduced into the medium-temperature heat exchange unit 6 together with the medium temperature absorbent that is separated from the medium temperature regenerator 3 and joined to the first connection pipe 56 through a second collection pipe and heat-exchanges with the low-temperature absorption solution that separated from the low-temperature regenerator 4 and introduced into the medium temperature heat exchange unit 6 through the low-temperature discharge pipe 46. The low-temperature absorbent heat-exchanged in the medium temperature heat exchange unit 6 is discharged to the second connection pipe 67 and the heat-exchanged medium temperature absorption solution is discharged to the second supply pipe 65.

The low-temperature absorbent discharged from the medium temperature heat exchange unit 6 is introduced into the low temperature heat exchange unit 7 along with the low-temperature absorption solution that is separated from the low-temperature regenerator 4 and joined to the second connection pipe 67 through a low-temperature branch pipe 467, and heat-exchanges with the medium-temperature absorption solution discharged from the refrigerant condensation heat exchange unit 8. After the heat exchange, the absorption solution that is introduced into the low temperature heat exchange unit 7 in the state of a low temperature absorption solution is collected to the absorber 1 through a third connection pipe 71, and the absorption solution introduced into the low temperature heat exchange unit 7 in the state of the absorption solution of the middle temperature is heat-exchanged and then flows into the low temperature regenerator 4 through a low temperature inflow pipe 74.

The refrigerant condensation heat exchange unit can heat-exchange the refrigerant in the liquid state introduced from the medium temperature regenerator 3 and the low temperature regenerator; with the absorption solution introduced through an absorber discharge pipe 18 from the absorber 1, and then may discharge the heat-exchanged solution to the condenser 9 and discharge the heat-exchanged absorption solution to a first supply pipe 87.

A first control valve 250 for controlling the flow rate of the high temperature and high pressure absorbent is connected to a high temperature discharge pipe 25 to control the flow rate of the absorbent flowing into the high temperature heat exchange unit 5.

A high pressure decompression device 560 for preventing a differential pressure between the absorbent joining through a second collection pipe 356 and the absorbent discharged from the high temperature heat exchange unit 5 may be connected to the first connection pipe 56.

The first connection pipe 56 is provided with a confluence point 56P which is formed at the wake of the high pressure decompression device 560, and at which the absorbent flowing through the second collection pipe 356 joins the first connection pipe 56.

At this time, when there is a differential pressure between the two absorbent flows joining at the confluence point 56P as the high pressure decompression device 560 does not function properly, the absorbent flowing the first connection pipe 56 flows back to the medium temperature regenerator 3 through the second collection pipe 356 to raise the water level of the medium temperature regenerator 3, and to prevent the absorbent from being smoothly collected to the absorber 1. The bypass collection pipe 200 for solving this problem will be described later.

A second control valve 4670 for controlling the flow rate of the low temperature and low pressure absorption solution is connected to a low temperature branch pipe 467 to control the flow rate of the absorption solution flowing into the low temperature heat exchange unit 7.

The absorbent or absorption solution flowing through the absorber discharge pipe 18, the low temperature discharge pipe 46, and the second connection pipe 67 can be extruded by a first pump 180, a second pump 460, and a third pump 670 respectively.

When the absorber 1 of the cooling machine is set as a starting point, the cycle can be described as follows. The refrigerant is dissolved in the absorbent in the absorber 1 and is supplied, to the high-temperature regenerator 2, the medium-temperature regenerator 3, and the low-temperature regenerator 4 as absorption solution of liquid state, respectively. The absorption solution supplied to each of the regenerators 2, 3 and 4 is heated by a heat source to be separated into a refrigerant and an absorbent, so that the refrigerant is supplied to the condenser 9, and the absorbent is collected to the absorber 1.

The refrigerant supplied to the condenser 9 is condensed by exchanging heat with the cooling water, depressurized through the expansion device and then supplied to the evaporator 10. The refrigerant supplied to the evaporator 10 is evaporated by exchanging heat with cold water, and in this process, the temperature of the cold water is lowered while discharging heat to the refrigerant. The refrigerant discharged from the evaporator 10 flows into the absorber 1 and lowers the temperature of the cold water by repeatedly rotating the series of cycles described above.

The cycle focusing on the flow of refrigerant is as follows. The refrigerant flowing into the high temperature regenerator in the absorption solution state is heated by an external heat source (not shown and separated into a gas state, and flows into the medium temperature regenerator 3 through a first gas pipe 23.

The absorption solution introduced into the medium temperature regenerator 3 through medium temperature inflow pipe 653 is heated by using a high temperature and high pressure refrigerant introduced into the medium temperature regenerator 3 through the first gas, pipe 23 as a heat source, and is separated into a refrigerant and an absorbent.

The medium temperature and medium pressure gas refrigerant separated from the medium temperature regenerator 3 is discharged through a second gas pipe 34 and flows into the low temperature regenerator 4, and is used as a heat source for heating the absorption solution introduced into the low temperature regenerator 4 through a low temperature inflow pipe 74, and separates the absorption solution into a refrigerant and an absorbent, and the separated refrigerant flows into the condenser 9 through a third gas pipe 49.

Meanwhile, the refrigerant separated from the medium temperature regenerator 3 and the low temperature regenerator 4 may be a gas state or a liquid state, and as described above, the refrigerant in the gas state flows into the condenser 9 through the second gas pipe 34 and the third gas pipe 49, and the liquid state refrigerant flows into the refrigerant condensation heat exchange unit. 8, heat exchanges with the absorption solution discharged from the absorber 1, and then flows into the condenser 9 and converges with the refrigerant, which is introduced into the condenser 9 through the third gas pipe 49 and is condensed, and flows into the expansion device E.

The refrigerant introduced into the expansion device E undergoes a depressurization process, flows into the evaporator 10, absorbs heat from cold water and evaporates, then flows into the absorber 1 again, and is dissolved again in the liquid absorbent to be an absorption solution.

The cycle focusing on the flow of cooling water is as follows. The cooling water flowing into the absorber 1 through a cooling water supply pipe 1a undergoes a heat exchange process, and then flows into the condenser 9 through a cooling water flow pipe 19, absorbs heat from the refrigerant, and then is discharged through a cooling water discharge pipe 9b.

The cycle focusing on the flow of cold water is as follows. The cold water flows into the evaporator 10 through a cold water inflow pipe 10a, dissipates heat to the refrigerant to evaporate the refrigerant, and then is discharged through a cold water discharge pipe 10b in the state where the temperature is lowered.

Figure 2:
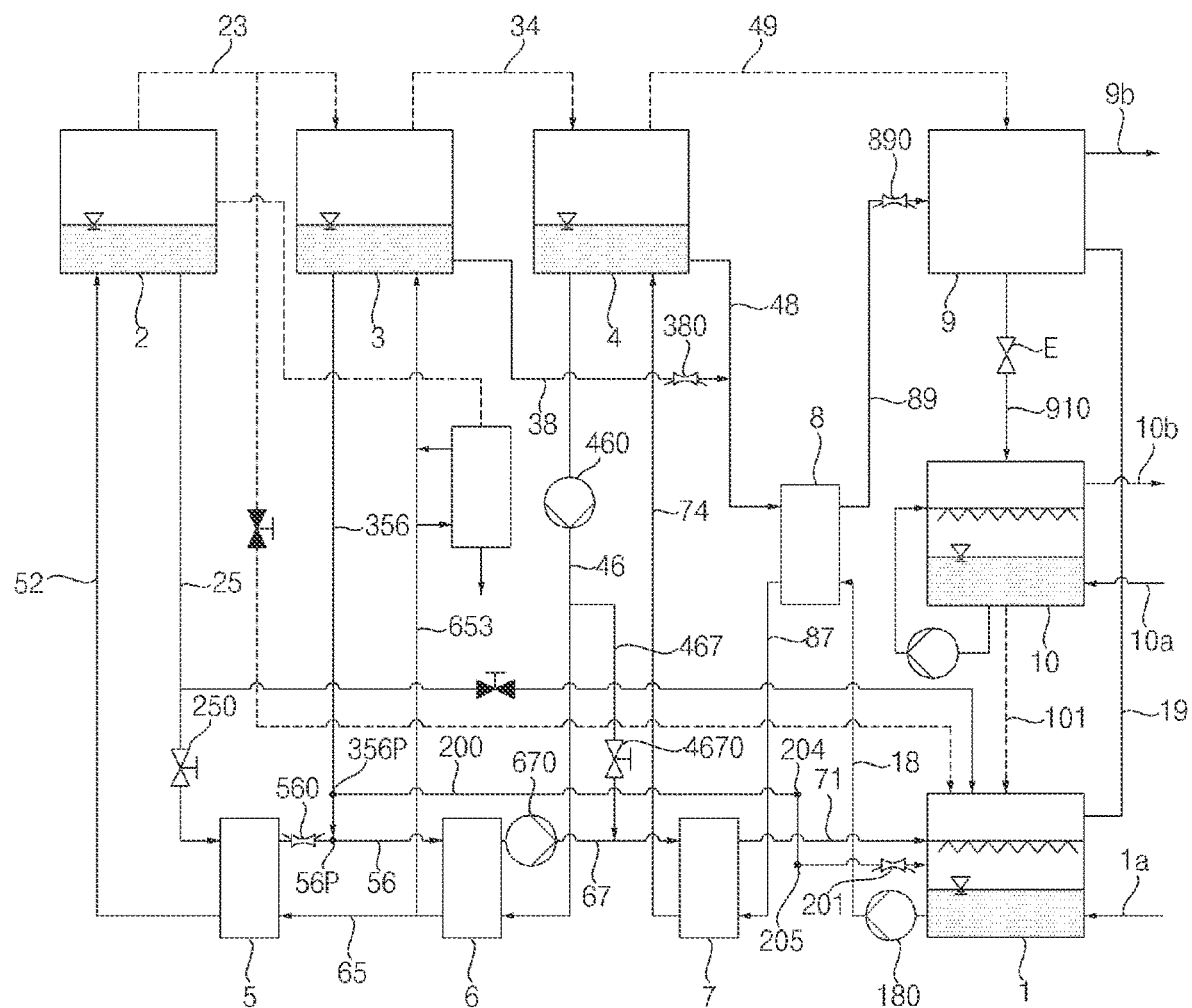
FIG. 2 is a schematic configuration diagram of a cooing machine according to an embodiment of the present disclosure.

Hereinafter, a cooling machine according to an embodiment of the present disclosure will be described with reference to FIGS. 2 and 3.

Hereinafter, a first collection pipe 20 through which the absorbent separated from the high temperature regenerator 2 is collected is used as a concept encompassing all of a high-temperature discharge pipe 25, a first connection pipe 56, a second connection pipe 67, and a third connection pipe 71 where the absorbent discharged from the high-temperature regenerator 2 flows in the process of being collected to the absorber 1.

Figure 3:
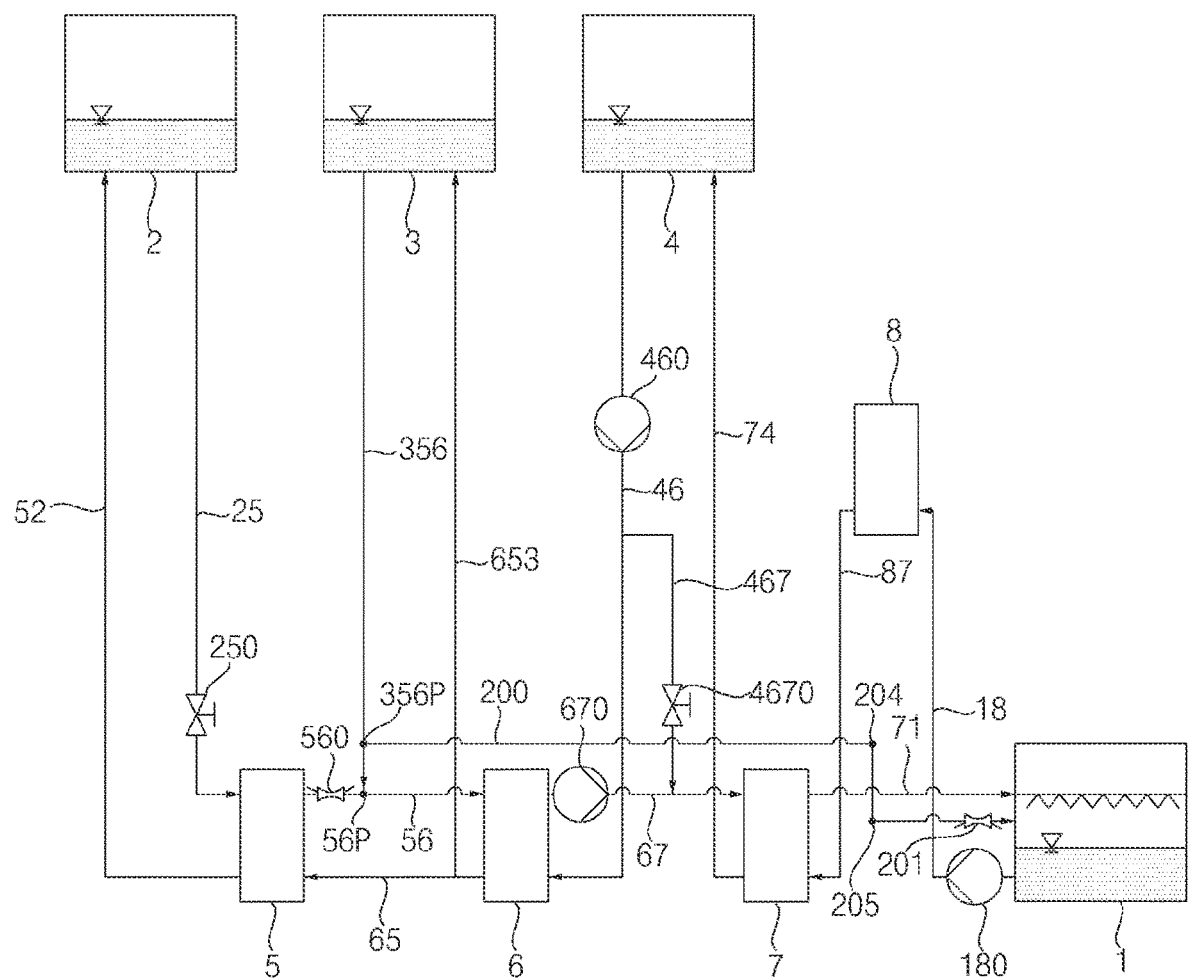

The cycle focusing on the flow of the absorbent with reference to FIG. 3 is as follows. The absorbent introduced into the refrigerant condensation heat exchange unit 8 through an absorber discharge pipe 18 in the state of the absorption solution as the refrigerant is dissolved in the absorber 1 exchanges heat with the refrigerant in the refrigerant condensation heat exchange unit 8 to be supplied with heat, and then flows into the low temperature heat exchange unit 7 through a first supply pipe 87.

The absorption solution introduced into the low-temperature heat exchange unit 7 is supplied with heat, then discharged to a low temperature inflow pipe 74 to flow into the low temperature regenerator 4, and a part of the absorption solution introduced into the low temperature regenerator 4 is separated into a refrigerant and an absorbent. The separated absorbent and the non-separated absorption solution are discharged to a low temperature discharge pipe 46 and introduced into the medium temperature heat exchange unit 6, or converged with the second connection pipe 67 through a low temperature branch. 467 branched from the low temperature discharge pipe 46.

The absorption solution introduced into the medium temperature heat exchange unit 6 is discharged to a second supply pipe 65 after being supplied with heat, and introduced into the high temperature heat exchange unit 5, or introduced into the medium temperature regenerator 3 through the medium temperature inflow pipe 653 branched from the second supply pipe 65.

A part of the absorption solution introduced into the medium temperature regenerator 3 is separated into a refrigerant and an absorbent, and the separated absorbent and the non-separated absorption solution are discharged into a second collection pipe 356 and converged with the first connection pipe 56 and flows into the medium temperature heat exchange unit 6.

The absorption solution introduced into the high-temperature heat exchange unit 5 flows into the high-temperature regenerator 2 after being supplied with heat, and separated into the refrigerant and the absorbent so that the separated absorbent flows into the high-temperature heat exchange unit 5 through the high-temperature discharge pipe 25

The absorbent introduced into the high temperature heat exchange unit 5 dissipates heat and is discharged to the first connection pipe 56 to flow into the medium temperature heat exchange unit 6, and dissipates heat again, and then is discharged to the second connection pipe 67 to flow into the low temperature heat exchange unit 7, and dissipates heat again, and then is collected by the absorber 1.

The absorbent separated from the high temperature regenerator 2 and collected to the absorber 1 through the first collection pipe 20 undergoes a process of being depressurized by the high pressure decompression device 560, and the depressurized absorbent is collected into the absorber 1 together with the absorbent converged through the second collection pipe 356.

At this time, a continence point. 56P, which is a point at which the second collection pipe 356 is converged with the first collection pipe 20, is formed at the wake of the high pressure decompression device 560, and the pressures of two flows converged at the confluence point 56P are formed identically, so that the converged flow must flow in the direction of the medium temperature heat exchange unit 6.

However, when a differential pressure between the two flows converging at the confluence point 56P occurs due to the failure of the high pressure decompression device 560, the flow inside the first collection pipe 20 having a relatively high pressure is reversed toward the medium temperature regenerator 3, and a smooth circulation of the absorbent is prevented, thereby reducing the overall efficiency of the cooling machine.

The absorbent reversely flowed to medium temperature regenerator 3 raises the water level of the medium temperature regenerator and flows into the second gas pipe 34 through which the gaseous refrigerant separated from the medium temperature generator 3 to contaminate the second gas pipe 34.

In order to solve the above problems, in the present disclosure, the bypass collection pipe 200 for guiding the absorbent flowing backward through the second collection pipe 356 in the direction of the absorber 1 is connected to the second collection pipe 356.

The bypass collection pipe 200 may be branched from the second collection pipe 356 and connected to the absorber 1, and a branch point 356P branched from the second collection pipe 356 may be formed in the second collection pipe 356.

The medium temperature regenerator 3, the branch point 356P, and the confluence point 56P may be disposed in the direction of gravity, the branch point 356P may be formed in a position lower than the medium temperature regenerator 3, and the confluence point 56P may be formed a position lower than the branch point 356P. Accordingly, the absorbent discharged from the medium temperature regenerator may fall to the confluence point 56P through the branch point 356P by gravity without additional power.

At this time, the bypass collection pipe 200 may be vertically connected to the second collection pipe 356, or may be connected at a certain angle, so that the absorbent falling through the second collection pipe 356 does not flow to the bypass collection pipe 200, but the whole flow rate may fall to the confluence point 56P due to gravity.

In addition when the absorbent flowing through the first collection pipe 20 flows back through the second collection pipe 356. The flow rate of the absorbent flowing back to the medium temperature regenerator 3 can be minimized due to the gravity direction arrangement of the medium temperature regenerator 3, the branch point 356P, and the confluence point 56P, and the absorbent flowing back through the branch point 356P located near the confluence point 56P can be guided directly to the bypass collection pipe 200.

The bypass collection pipe 200 may be connected to a bypass decompression device 201 that depressurizes the absorbent flowing through the bypass collection pipe 200. The bypass decompression device 201 may depressurize the high pressure absorbent that flows back from the first collection pipe 20 and flows into the bypass collection pipe 200, and then flow the depressurized absorbent into the absorber 1.

The bypass decompression device 201 may be connected to the bypass collection pipe 200 at a position closer to the absorber 1 than the branch point 356P, thereby achieving the purpose of decompression while maximizing the flow rate of the absorbent introduced from the branch point 356P to the bypass collection pipe 200.

The bypass collection pipe 200 may be vertically connected to the second collection pipe 356 from the branch point 356P to a first point 204, may be extended from the first point 204 to a second point 205 in the direction of gravity, may be extended from the first point 204 to have an acute angle with respect to the direction of gravity, and may be connected to the absorber 1. Accordingly, it is possible to prevent the absorbent introduced into the bypass collection pipe 200 from stagnating inside the bypass collection pipe 200, so that the absorption of the absorbent to the absorber can be smoothly performed.

T bypass decompression device 201 may be connected to the bypass collection pipe 200 between the second point 205 and the absorber 1.

Figure 4:
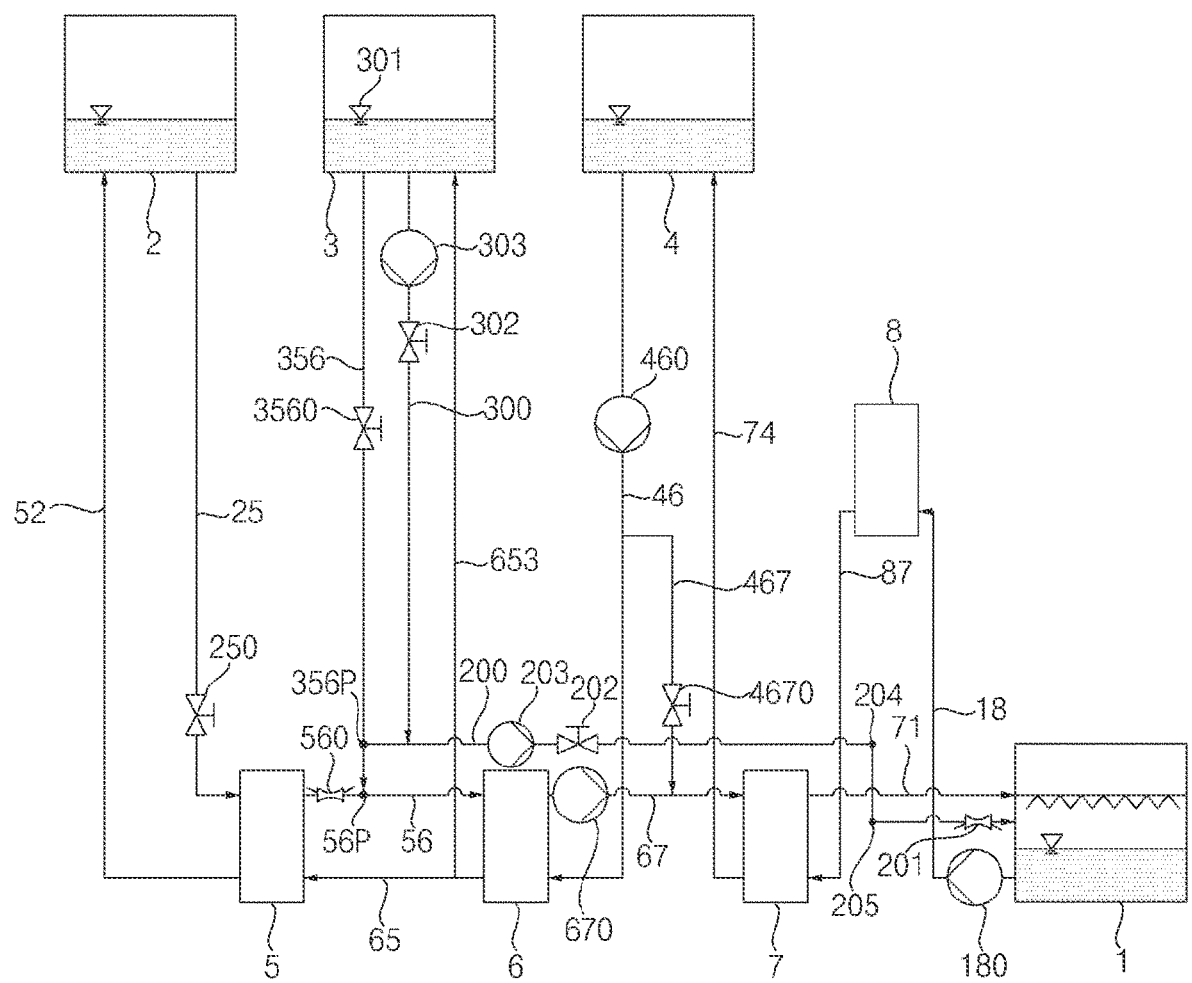
FIG. 4 is a diagram showing the flow of an absorbent according to another embodiment of the present disclosure.

Hereinafter, additional devices for maximizing the operational effect of the bypass collection pipe 200 according to an embodiment of the present disclosure will be described with reference to FIG. 4.

The bypass collection pipe 200 may be connected to a bypass valve 202 for adjusting the flow rate of the absorbent flowing through the bypass collection pipe 200, and may be connected to a bypass pump 203 extruding the absorbent flowing through the bypass collection pipe 200 in the direction of the absorber 1.

The second collection pipe 356 may be connected to a backflow prevention valve 3560 that blocks the flow of absorbent flowing from the confluence point 56P toward the medium temperature regenerator 3. The backflow prevention valve 3560 may use solenoid valve that controls the flow rate of the absorbent flowing through the second collection pipe 356, or use a check valve that controls the flow of the absorbent flowing through the second collection pipe 356 in one direction.

A drain pipe 300 which is connected to the medium temperature regenerator 3 and drains the absorbent from the medium temperature regenerator 3 may be connected to the bypass collection pipe 200. The drain pipe 300 may be connected to extend in the direction of gravity from the medium temperature regenerator 3.

The drain pipe 300 may be connected to a drain valve 302 that controls the flow of the drain pipe 300, and may be connected to the drain pump 303 that extrudes the absorbent flowing through the drain pipe 300 in the direction of the bypass collection pipe 200.

A water level sensor 301 for measuring the water level of the medium temperature regenerator 3 may be disposed inside the medium temperature regenerator 3, and the water level sensor 301 converts the measured water level value into an electrical signal and transfers to a backflow prevention valve 3560, a drain valve 302, a drain pump 303, a bypass valve 202, and a bypass pump 203.

The backflow prevention valve 3560 may be opened or closed based on an electrical signal received from the water level sensor 301. At this time, the water level sensor 301 may set and store the threshold of the water level in the medium temperature regenerator 3, and a control process may be performed such that the backflow prevention valve 3560 is closed when the measured water level value exceeds the threshold value, and the backflow prevention valve 3560 is open when the measured water level value is less than the threshold.

The opening degree of the bypass valve 202 and the drain valve 302 may be adjusted based on the electrical signals received from the water level sensor 301. At this time, the opening degree of the bypass valve 202 and the drain valve 302 may be adjusted to be proportional to the water level value measured by the water level sensor 301.

The amount of extrusion of the bypass pump 203 and the drain pump 303 may be adjusted based on the electrical signal received from the water level sensor 301. At this time, the extrusion amount of the bypass pump 203 and the drain pump 303 can be adjusted to be proportional to the water level value measured by the water level sensor 301.

According to the cooling machine the present disclosure has one or more of the following effects.

First, it is possible to prevent the contamination problem of the refrigerant pipe due to the rise of water level of the low pressure condition regenerator, by guiding the absorbent flowing back into the low pressure condition regenerator through the bypass collection pipe to the absorber.

Second, t is possible to prevent the problem of reduction in efficiency of the cooling machine, by guiding the absorbent which flows back to the low pressure condition regenerator to be stagnated in the regenerator or refrigerant pipe to the absorber, thereby being smoothly circulated.

Third, it is possible to maintain a constant level of the low pressure condition regenerator while minimizing unnecessary absorbent flow, through the configuration of an additional feedback device that is adjusted according to the water level of the low pressure condition regenerator.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative will also be apparent to those skilled in the art.

What is claimed is:

1. A cooling machine comprising:
an absorber to generate an absorption solution by mixing a refrigerant and an absorbent;
a first regenerator to separate the absorption solution discharged from the absorber into the refrigerant and the absorbent;
a second regenerator to separate the absorption solution discharged from the absorber into the refrigerant and the absorbent;
a first collection pipe through which the absorbent discharged from the first regenerator flows, and is connected to the absorber; and
a second collection pipe through which the absorbent discharged from the second regenerator flows,
wherein the absorbent discharged from the first regenerator has a higher pressure than the absorbent discharged from the second regenerator,
wherein a confluence point where the absorbent flowing through the second collection pipe converges with the absorbent flowing through the first collection pipe is formed,
further comprising a bypass collection pipe branched between the second regenerator and the confluence point and connected to the absorber.

2. The cooling machine of claim 1, wherein the bypass collecton pipe is connected to a bypass decompression device that lowers a pressure of the absorbent flowing through the bypass collection pipe.

3. The cooling machine of claim 1, wherein the second collection pipe connected to the second regenerator and extended in a direction of gravity, and has a branch point branched from the second collection pipe to the bypass collection pipe,
wherein the branch port is formed at a lower position than the second regenerator, and the confluence point is formed at a position lower than the branch point.

4. The cooling machine of claim 1, wherein the bypass collection pipe is connected to a bypass valve to control a flow rate of the absorbent flowing through the bypass collection pipe.

5. The cooling machine of claim 1, wherein the bypass collection pipe is connected to a bypass pump to extrude the absorbent flowing through the bypass collection pipe.

6. The cooling machine of claim 1, further comprising a water level sensor to measure a water level of the second regenerator,
wherein the bypass collection pipe is connected to a bypass valve for adjusting a flow rate of the absorbent flowing through the bypass collection pipe and adjusting opening degree according to the water level measured by the water level sensor, and
wherein the bypass collection pipe is connected to a bypass pump for extruding the absorbent flowing through the bypass collection pipe and adjusting an extrusion amount of the absorbent according to the water measured by the water level sensor.

7. The cooling machine of claim 1, further comprising a drain pipe which connected to the second regenerator, and through which the absorbent flows,
wherein the drain pipe is connected to a drain valve for controlling a flow rate of the absorbent flowing through the drain pipe, and
wherein the absorbent flowing through the drain pipe is converged with the bypass collection pipe.

8. The cooling machine of claim 1, further comprising a drain pipe which is connected to the second regenerator, and through which the absorbent flows,
wherein the drain pipe is connected to a drain pump for extruding the absorbent flowing through the drain pipe, and
wherein the absorbent flowing through the drain pipe is converged with the bypass collection pipe.

9. The cooling machine of claim 1, further comprising:
a water level sensor to measure a water level of the second regenerator; and
a drain pipe which is connected to the second regenerator, and through which the absorbent flows,
wherein the drain pipe is connected to a drain valve for controlling a flow rate of the absorbent flowing through the drain pipe, and adjusting an opening degree according to the water level measured by the water level sensor, and
wherein the drain pipe is connected to a drain pump for extruding the absorbent flowing through the drain pipe and adjusting an extrusion amount of the absorbent according to the water level measured by the water level sensor,
wherein the absorbent flowing through the drain pipe is converged with the bypass collection pipe.

10. The cooling machine of claim 1, wherein the second collection pipe is connected to a backflow prevention valve adjusting a flow rate of the absorbent flowing through the second collection pipe.

11. The cooling machine of claim 1, further comprising a water level sensor to measure a water level of the second regenerator,
wherein the second collection pipe is connected to a backflow prevention valve adjusting a flow rate of the absorbent flowing through the second collection pipe and adjusting an opening degree according to the water level measured by the water level sensor.

12. The cooling machine of any one of claims 1 to 11, further comprising a third regenerator to separate the absorption solution discharged from the absorber into the refrigerant and the absorbent,
wherein the third regenerator separates the refrigerant and the absorbent under a lower temperature and lower pressure than the first regenerator and the second regenerator.

* * * * *